United States Patent
Deutsch

(10) Patent No.: US 10,331,218 B2
(45) Date of Patent: *Jun. 25, 2019

(54) GYROSCOPE MOTION FEEDBACK DEVICE

(71) Applicant: Real Simple Ideas, LLC, Orlando, FL (US)

(72) Inventor: Daniel J. Deutsch, Orlando, FL (US)

(73) Assignee: REAL SIMPLE IDEAS, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,145

(22) Filed: Aug. 9, 2018

(65) Prior Publication Data

US 2018/0373338 A1  Dec. 27, 2018

Related U.S. Application Data

(63) Continuation of application No. 15/706,638, filed on Sep. 15, 2017.

(60) Provisional application No. 62/394,803, filed on Sep. 15, 2016.

(51) Int. Cl.
| | |
|---|---|
| *G01C 19/42* | (2006.01) |
| *G01C 19/02* | (2006.01) |
| *G06F 3/01* | (2006.01) |
| *G05G 5/03* | (2008.04) |

(52) U.S. Cl.
CPC ............ *G06F 3/016* (2013.01); *G01C 19/42* (2013.01); *G01P 9/02* (2013.01); *G05G 5/03* (2013.01); *G06F 2203/013* (2013.01); *G06F 2203/015* (2013.01)

(58) Field of Classification Search
CPC .... G01C 19/42; G01C 21/20; G01C 21/3652; G01P 9/02; G06F 3/016; G05G 5/03; G01D 5/12; G01D 5/145; G01D 5/40
See application file for complete search history.

(56) References Cited

U.S. PATENT DOCUMENTS

| | | | | |
|---|---|---|---|---|
| 5,754,023 | A * | 5/1998 | Roston ................. | B25J 9/1689 318/561 |
| 6,424,333 | B1 * | 7/2002 | Tremblay .............. | G06F 3/011 345/156 |
| 7,979,797 | B2 * | 7/2011 | Schena ................. | A63F 13/06 345/156 |
| 9,030,149 | B1 * | 5/2015 | Chen .................... | F16M 13/04 318/649 |
| 9,474,683 | B1 * | 10/2016 | Mortimer ........... | A61H 23/0263 |
| 2002/0080112 | A1 * | 6/2002 | Braun .................. | G06F 3/016 345/156 |
| 2002/0142699 | A1 * | 10/2002 | Davis ................... | A63H 27/04 446/37 |

(Continued)

*Primary Examiner* — Helen C Kwok

(74) *Attorney, Agent, or Firm* — Allen Dyer Doppelt & Gilchrist

(57) ABSTRACT

A gyroscopic motion feedback device utilizes one or more pairs of masses mounted on a common axis but independently rotatable to allow rapid variation of the gyroscopic force produced thereby. A sensor detects motion of the mount and a controller uses the detected motion to vary the relative rotational speed of the masses. The device provides haptic feedback where the mount is used to the control the interaction of an objection in a virtual environment, with the controller further varying the relatively rotational speed based on virtual interactions experienced by the object.

16 Claims, 5 Drawing Sheets

(56) References Cited

U.S. PATENT DOCUMENTS

| | | | |
|---|---|---|---|
| 2010/0022300 A1* | 1/2010 | Chen | A63F 13/06 |
| | | | 463/30 |
| 2013/0074631 A1* | 3/2013 | Hanlon | B64C 13/04 |
| | | | 74/471 XY |
| 2013/0233100 A1* | 9/2013 | Kim | G01C 19/06 |
| | | | 74/5.95 |
| 2014/0297130 A1* | 10/2014 | Griffiths | B25J 5/007 |
| | | | 701/42 |
| 2015/0202113 A1* | 7/2015 | Chiu | A61H 3/008 |
| | | | 601/23 |
| 2016/0144404 A1* | 5/2016 | Houston | B06B 1/166 |
| | | | 318/114 |
| 2016/0258758 A1* | 9/2016 | Houston | G01C 21/20 |
| 2017/0101178 A1* | 4/2017 | Lee | B64C 39/024 |
| 2017/0267171 A1* | 9/2017 | Sweney | B60C 9/00 |
| 2018/0059794 A1* | 3/2018 | Nakamura | G06F 3/016 |
| 2018/0105266 A1* | 4/2018 | Lee | B64C 27/52 |

* cited by examiner

GYROSCOPE MOTION FEEDBACK DEVICE

CROSS-REFERENCE TO RELATED APPLICATION

This application is a continuation of U.S. Non-Provisional application Ser. No. 15/706,638, filed on Sep. 15, 2017, which claims the benefit of U.S. Provisional Application Ser. No. 62/394,803, filed on Sep. 15, 2016, the contents of which applications are herein incorporated by reference in their entirety.

FIELD OF THE INVENTION

The invention relates to the use of gyroscopic forces, and more particularly, to devices and methods for using gyroscopic forces for motion feedback.

BACKGROUND OF THE INVENTION

The use of a rotating mass to create a dampening force opposite to an applied force, herein referred to as gyroscopic force is well known in mechanical physics. The bicycle is perhaps the most widely known example, where the gyroscopic force generated by the spinning wheels helps resist side-to-side tipping forces. Although the concept of the gyroscopic-stabilized device has been well known for many years, such devices have generally used gyroscopic force to dampen or prevent unwanted motion.

A simplified system illustrating the use of gyroscopic force in this manner can be seen in FIG. 1. A stabilizing module 100 includes:
a) a power source 110
b) a controller 112
c) a rotary electric motor 114
d) a shaft coupling 116
e) a specific mass 120 that may be rotated
f) a mount 122 for the system In a traditional stabilizing module, the motor is made to spin by the controller and power source. The spinning imparts gyroscopic force such that an external force is dampened (neutralized) and the stabilizing system "resists" the external force. Additionally, this simple system may be replicated and oriented with up to three stabilizing module units 200X, 200Y, 200Z arranged orthogonally to each other (one for each of the Cartesian X, Y and Z axes) such as shown in FIG. 2, and a complete motion stabilizing system 300 is created that will resist external forces from any source. While such systems are useful, further improvements are possible.

SUMMARY OF THE INVENTION

In view of the foregoing, it is an object of the present invention to provide an improved gyroscopic motion feedback device and related methods. According to an embodiment of the present invention, a gyroscopic motion feedback device includes a mount, a first gyroscope module connected to the mount, a sensor operable to detect motion of the mount, a controller in signal communication with the first gyroscope module and the sensor, and a power source supplying electrical power to the first gyroscope module, the sensor and the controller. The first gyroscope module includes a first pair of masses aligned along a first axis and rotatable thereabout, and a first pair of motors, each of the first pair of motors connected to a respective one of the first pair of masses and operable to independently rotate the respective one of the first pair of masses about the first axis at a variable rotational speed. The controller is configured with program instructions to vary a relative rotational speed of the first pair of motors in response to the motion detected by the sensor.

According to an aspect of the invention, second and/or third gyroscope modules are also connected to the mount aligned along different axes and also operated by the controller. According to another aspect of the invention, the mount is configured as a handle with the gyroscope modules arranged therein. According to a further aspect, the mount is used to control the position of an object within a virtual environment, and the controller operates the gyroscope module(s) based on interactions of the object within the virtual environment.

According to an additional aspect of the invention, the controlled is configured to vary a relative counter-rotational speed of the pair of motors in response to the motion detected by the sensor from a neutral state, in which gyroscopic forces generated by rotation of the pair of masses are cancelled out, to a destabilized state, in which the gyroscopic forces generated by rotation of the pair of masses are not cancelled out. According to yet another aspect, the controller is configured to vary a rotational direction of at least one of the pair of motors.

According to a method aspect for providing haptic feedback, a method includes detecting motion of the mount, communicating the motion of the mount to the controller, and varying, via the controller, the relative rotational speed of the pair(s) of motors to vary the gyroscopic force(s) generated by the gyroscope module(s), in response to the detected motion.

These and other objects, aspects and advantages of the present invention will be better appreciated in view of the drawings and following detailed description of preferred embodiments.

DETAILED DESCRIPTION OF THE PREFERRED EMBODIMENTS

In view of the foregoing, it is an object of the present invention to provide a gyroscopic motion feedback device. A system according to the present invention uses gyroscopic forces, created by one or more gyroscope modules controlled by a combination of electronics and programmed to produce the desired feedback. The system, in particular, is operable to change the effect of the gyroscope module(s) to output the gyroscopic force in a manner that will destabilize the system in a desired manner.

Figure 1:
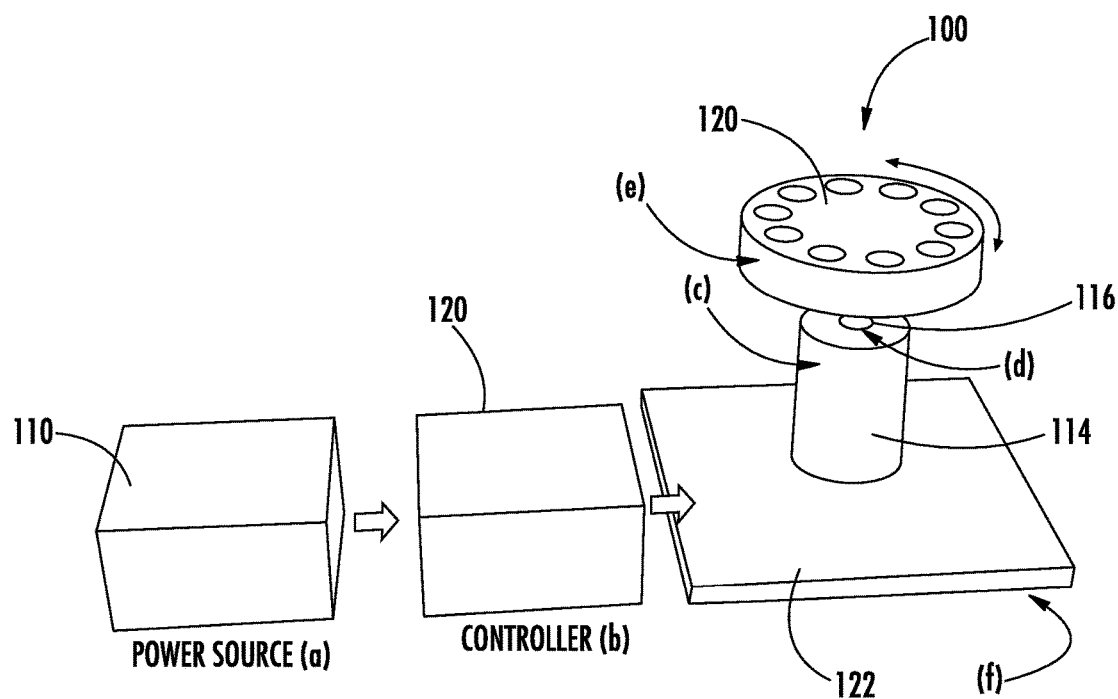
FIG. 1 is a schematic overview of a stabilizing module.
Figure 2:
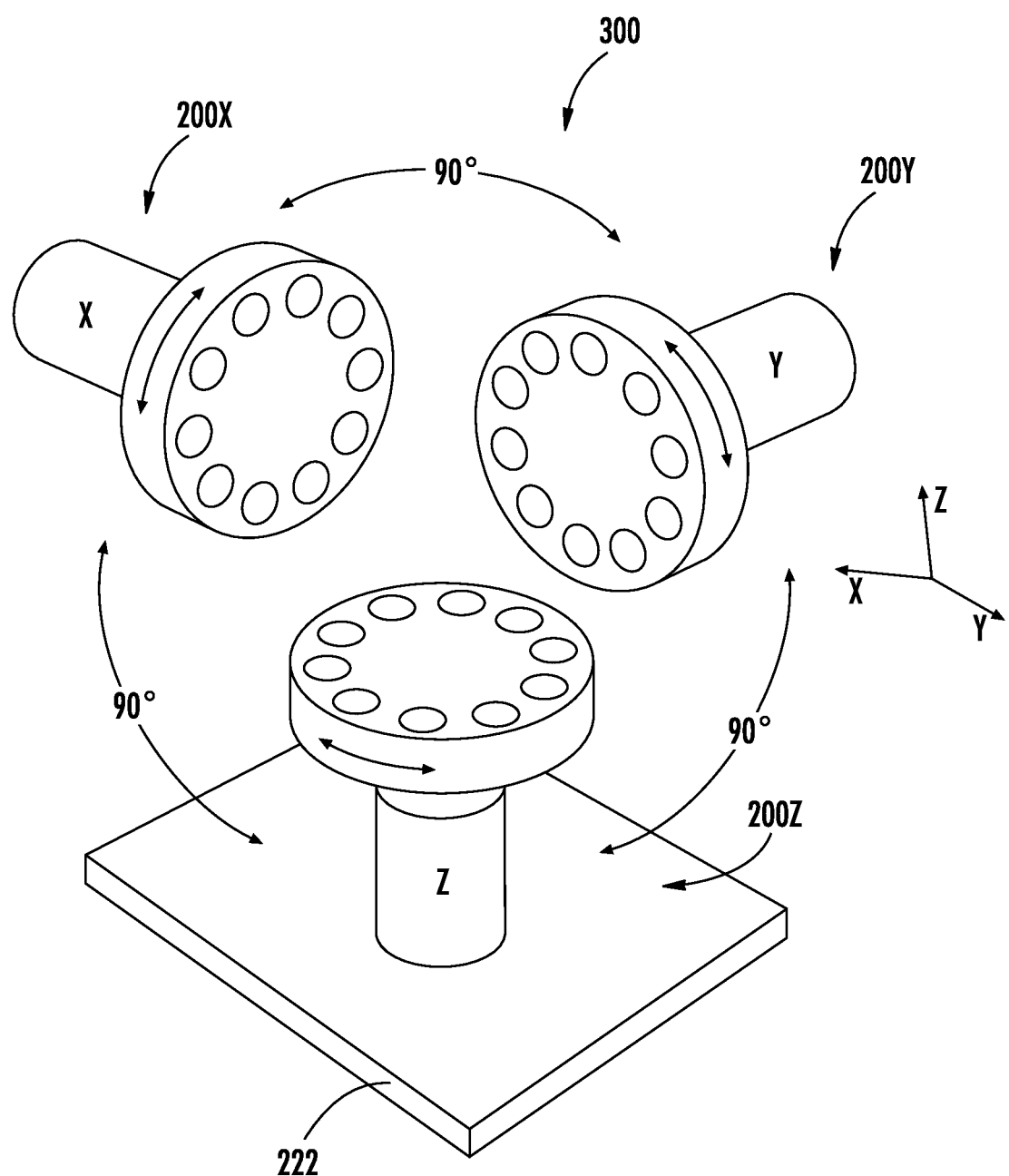
FIG. 2 is a schematic overview of a motion stabilizing system including three stabilizing modules.
Figure 3:
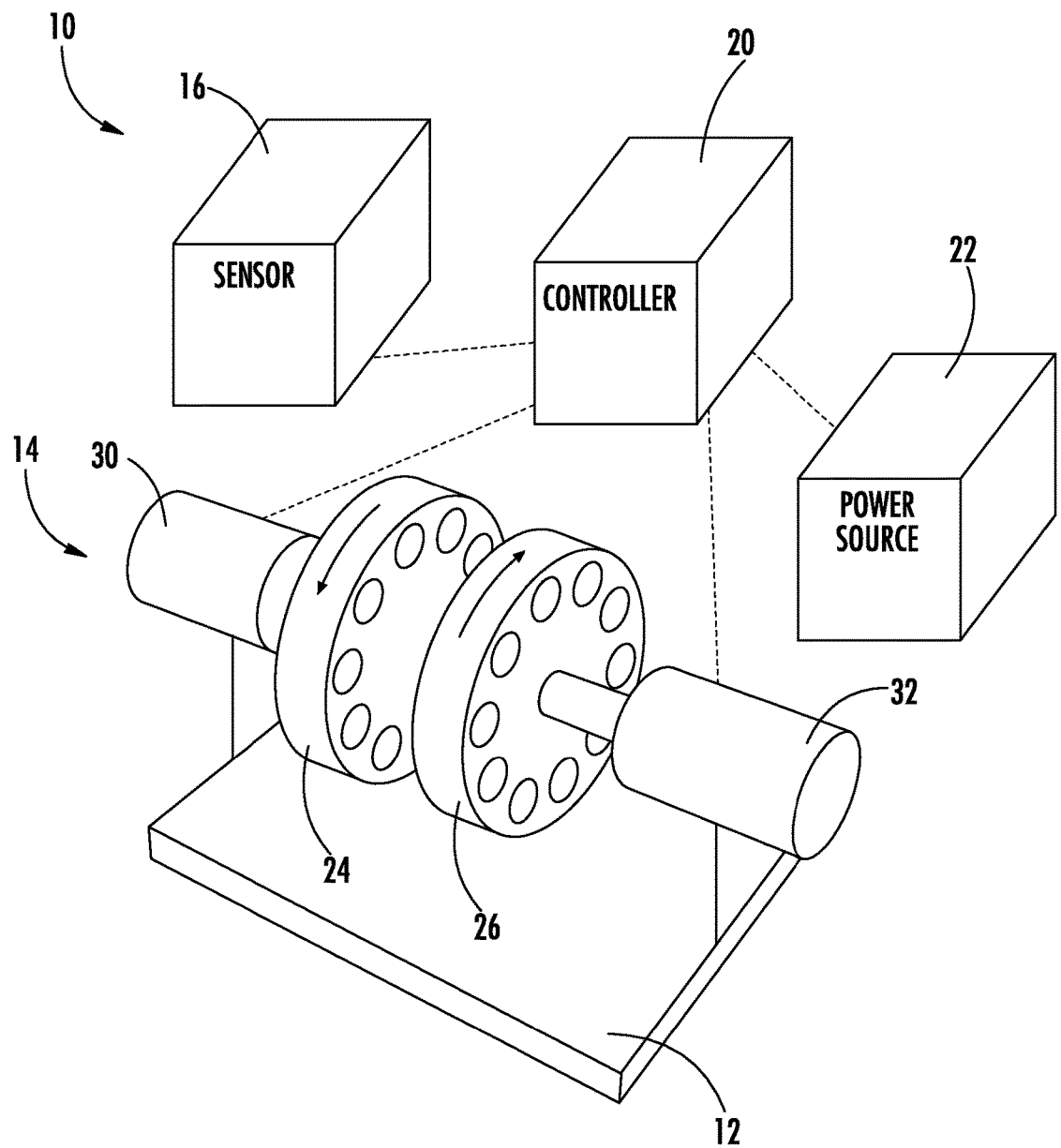
FIG. 3 is a schematic overview of a gyroscopic motion feedback device, according to an embodiment of the present invention.

Referring to FIG. 3, according to an embodiment of the present invention, a gyroscopic motion feedback device 10 includes a mount 12 connected to a gyroscope module 14. A sensor 16, such as an accelerometer, is operable to detect motion of the mount 12. A controller 20 is in signal communication with the sensor 16 and the gyroscope module 14. A power source 22 supplies electrical power to the gyroscope module 14, sensor 16 and controller 20.

The gyroscope module 14 includes a pair of masses 24, 26 aligned along a common axis and rotatable thereabout, as well as a first pair of motors 30, 32, each of the first pair of motors 30, 32 connected to a respective one of the first pair of masses 24, 26 and operable to independently rotate the respective one of the first pair of masses about the first axis at a variable rotational speed.

The controller 20, preferably a programmable logic controller, game controller or other programmable computer, is configured with program instructions to vary the relative rotational speed of the pair of motors 30, 32 in response to the motion detected by the sensor 16.

Counter-rotating masses/motors are advantageously utilized. The physics of counter-rotating masses is such that, should one mass be rotating clockwise, the other opposite to it and at equal relative speed, the net effect is that the gyroscopic force are canceled out. For example, a user holding a handheld version of the device effectively does not perceive the gyroscopic force.

By controlling the differential between these two rotating masses, the amount of gyroscopic force may be controlled, and advantageously, varied relatively rapidly. A significant advantage of the gyroscope module is to take advantage of, and to correct a mechanical limitation in common free-spinning motors when they are rotated at the high speeds necessary to create gyroscopic force. Namely, it is functionally impossible to accelerate a given mass from one velocity to another instantaneously. It is also more difficult to decelerate a rotating mass to a significantly slower velocity due to the combined inertia of the rotating mass, the inertia of the motor rotor itself and the typical methods used for commutating electrical current to motors in use today.

For a specific instance, the use of a permanent-magnet direct-current motor would allow for a very high rate of acceleration (given an unlimited current input), however decelerating would take more time. Common practices to electrically decelerate a system of this type include reducing current, (which is slow), "plugging" whereby the reverse current is applied in either a continuous fashion (causes overheating), or pulsed (which is slow), or by shunting, whereby the current is removed and the motor leads are tied together causing a short-circuit and a braking ability; this is limited by motor design and rotor inertia combined with the rotor velocity and thus is variable and often unpredictable.

By placing two masses on an axis, the controller may make the decision to set two units in the same direction (a multiplying force), reduce speed, or even change direction taking account for the required time such that the system appears to react instantly. Additionally, the controller may also decide to use the motors in opposite directions but only at half-speed (the gyroscopic force is nulled), however for a fast reaction may then increase the speed of one motor to full, which gives a faster response than having to reduce speed and reverse.

Figure 4:
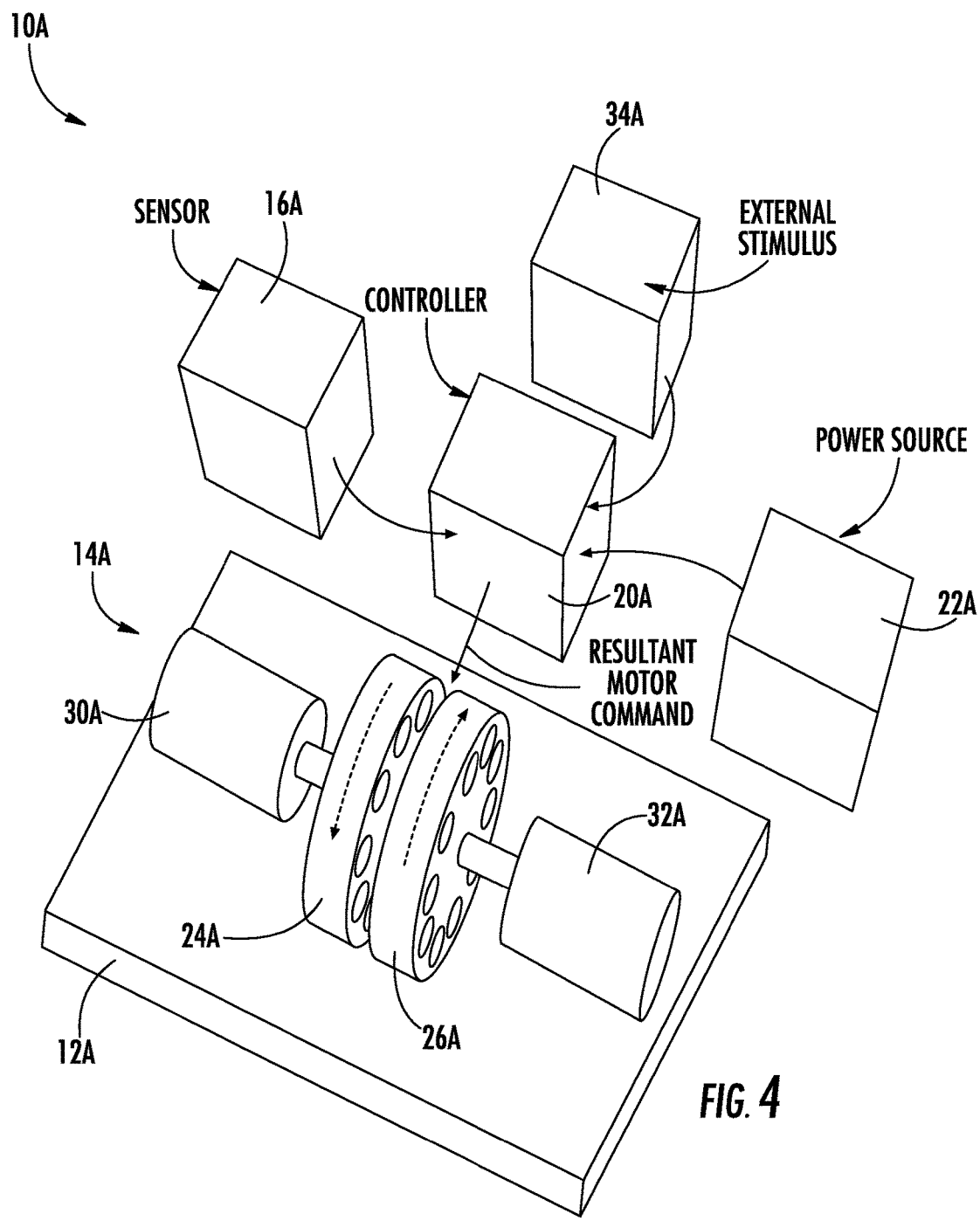
FIG. 4 is a schematic overview of a gyroscopic motion feedback device, according to another embodiment of the present invention.

Referring to FIG. 4, a gyroscopic motion feedback device 10A can be used to provide feedback related to movement of an object within a virtual environment. For example, the motion of the mount 12A as detected by the sensor 16A (or other means) is used to control the position of the object in a virtual environment. A further input 34A supplied to the controller 20A, such as a velocity command, represents the interaction of the object within the virtual environment. The controller 20A is further configured with program instructions to vary the relative speeds of the motors 30A, 32A—and hence gyroscopic forces generated—based on the input 34A.

Figure 5:
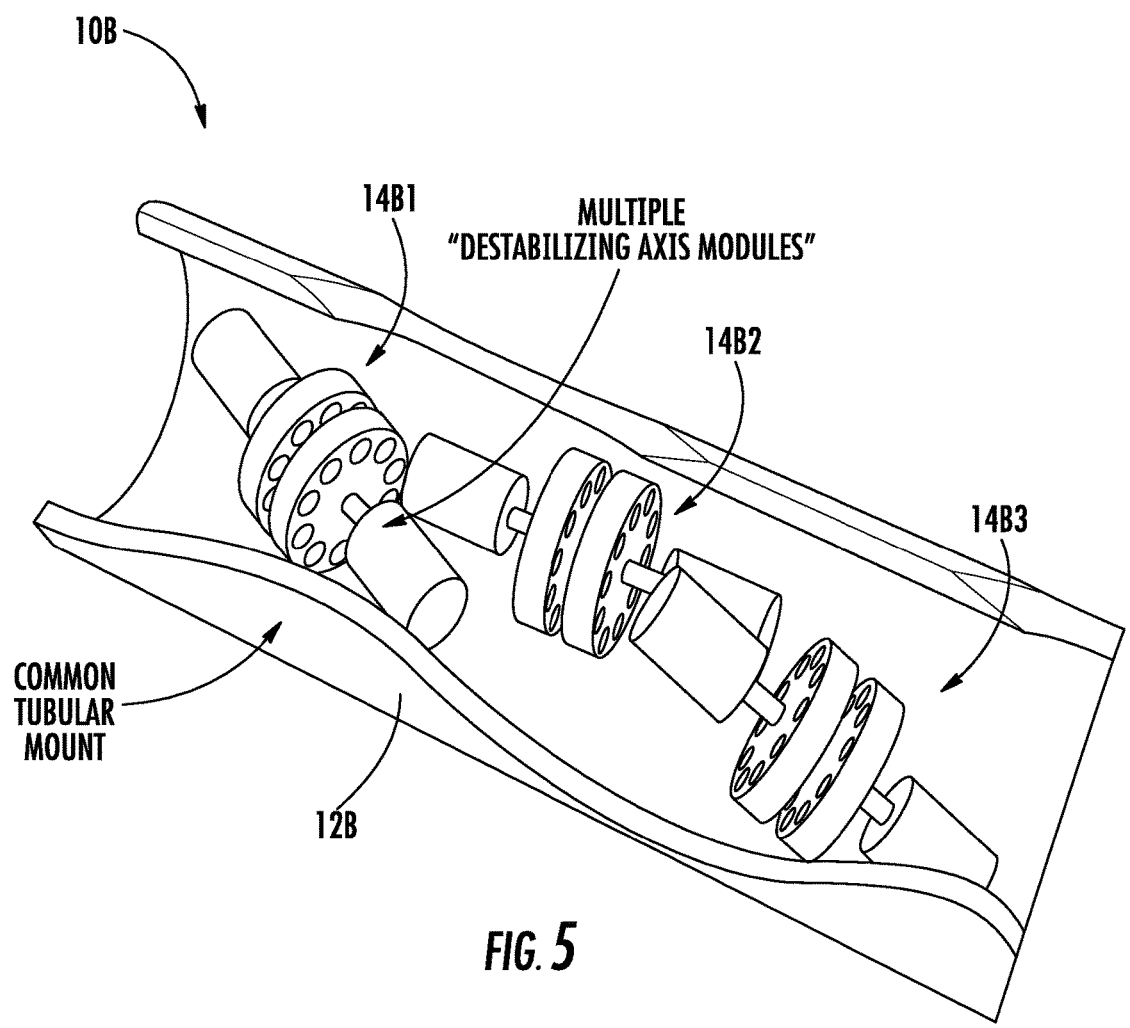
FIG. 5 is a schematic overview of a gyroscopic motion feedback device, according to a further embodiment of the present invention.

Referring to FIG. 5, in a gyroscopic motion feedback device 10B, multiple gyroscope modules 1461, 1462 and 1463 are commonly connected to the mount 12B, each arranged along a different axis. The common mount 12B can be configured as a handle (such as a tubular handle) to allowing a user to hold it, and then experience a physical response to holding the device, moving the device, and (despite the absence of true physical contact) a "virtual impact" that causes the user to feel that they have received an external force. The arrangement of FIG. 5 could be advantageously incorporated, for example, into a game controller evocative of a sword, baseball bat, tennis racket, golf club, etc.

Exemplary Device Application

Given a video game or virtual reality scenario where a user, herein referred to as "player", may be immersed in an environment (such as large screens, projections or headsets used in this field), the player would hold the invention in their hands, similar to a sword or bat (or other object, as desired). As one may swing a sword around in free-space, so could the player; in this instance, the full length of the sword may not exist in reality, but it is presented to the player through the video game interface. However, the device still needs to respond and give feedback to the player using real forces, to allow the player to feel like they are "in the game".

The device responds to this is as follows:

a) the accelerometer and/or other sensors determine that the device is moving (external forces imparted by the player), and communicate those vector values (the amount and direction the device is moving) to the controller;

b) the controller uses programmed algorithms to compute how the rotating masses should be controlled (speed, direction and which ones to which degree) to impart a reactive force to the device;

c) depending on the output from the controller, the motors may change state and either directly increase the externally applied force (additive), directly decrease the externally applied force (subtractive), impart a force differential to the external force (reactive), or not change at all (ineffective); and d) additionally, the controller may use external commands (from the video game itself) to determine if there are any items that may "Virtually Collide" with the player's sword under which circumstances the algorithm will synthesize a specific reaction profile to allow the player to perceive that they have "hit something".

In this sample utilization, the invention may be considered a "haptic feedback device", of which there is a specific field for the development and use of such devices. The tradition of haptics however has been to remain with a vibratory or pseudo-stimulant forces (such as air blasts or sonic rumbling) that are generic in nature, not synthesized to be a specific reaction. Additionally, haptics, as typically used today, do not create additive forces; they are a response to existing touch or contact. The invention as described is unique to this instance since it has the capability to create an arbitrary but intentional force vector to be imparted to the player.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A gyroscopic motion feedback device, the device comprising:
   a mount;
   a first gyroscope module connected to the mount, the first gyroscope module including:
      a first pair of masses aligned along a first axis and rotatable thereabout, each of the first pair of masses being circular and aligned coaxially about the first axis; and
      a first pair of motors, each of the first pair of motors connected to a respective one of the first pair of masses and operable to independently rotate the respective one of the first pair of masses about the first axis at a variable rotational speed;
   a sensor operable to detect motion of the mount;
   a controller in signal communication with the first gyroscope module and the sensor and configured with program instructions to vary a relative rotational speed of the first pair of motors in response to the motion detected by the sensor; and
   a power source supplying electrical power to the first gyroscope module, the sensor and the controller;
   wherein the program instructions to vary the rotational speed of the first pair of motors include program instructions to vary a relative counter-rotational speed of the first pair of motors; and
   wherein the program instructions to vary the relative counter-rotational speed of the first pair of motors include program instructions to vary the relative counter-rotational speed from a neutral state, in which gyroscopic forces generated by rotation of the first pair of masses are cancelled out, to a destabilized state, in which the gyroscopic forces generated by rotation of the first pair of masses are not cancelled out.

2. The gyroscopic motion feedback device of claim 1, further comprising a second gyroscope module connected to the mount, the second gyroscope module including:
   a second pair of masses aligned along a second axis and rotatable thereabout, the second axis being offset from the first axis; and
   a second pair of motors, each of the second pair of motors connected to a respective one of the second pair of masses and operable to independently rotate the respective one of the second pair of masses about the second axis at a variable rotational speed;
   wherein the controller is further configured with program instructions to vary a relative rotational speed of the second pair of motors in response to the motion detected by the sensor, and the power source further supplies electrical power to the second gyroscope module.

3. The gyroscopic motion feedback device of claim 2, further comprising a third gyroscope module connected to the mount, the third gyroscope module including:
   a third pair of masses aligned along a third axis and rotatable thereabout, the third axis being offset from the first and second axes; and
   a third pair of motors, each of the third pair of motors connected to a respective one of the third pair of masses and operable to independently rotate the respective one of the third pair of masses about the third axis at a variable rotational speed;
   wherein the controller is further configured with program instructions to vary a relative rotational speed of the third pair of motors in response to the motion detected by the sensor, and the power source further supplies electrical power to the third gyroscope module.

4. The gyroscopic motion feedback device of claim 3, wherein the mount is configured as a handle for grasping by a user.

5. The gyroscopic motion feedback device of claim 4, wherein the first, second and third gyroscope modules are located inside the handle.

6. The gyroscopic motion feedback device of claim 5, wherein the handle is tubular.

7. The gyroscopic motion feedback device of claim 1, wherein the sensor is connected to the mount.

8. The gyroscopic motion feedback device of claim 7, wherein the sensor includes an accelerometer.

9. The gyroscopic motion feedback device of claim 1, wherein the controller is further configured with program instructions to vary the relative rotational speed of the first pair of motors in response to a signal representative of an interaction of an object controlled by the mount in a virtual environment.

10. The gyroscopic motion feedback device of claim 9, wherein the mount is configured as a handle for grasping by a user.

11. The method of claim 1, wherein the controller is further configured with program instructions to vary a rotational direction of at least one of the first pair of motors.

12. A method for providing haptic feedback, the method comprising:
   detecting motion of a mount to which a first gyroscope module connected, the first gyroscope module including a first pair of circular masses coaxially aligned along a first axis and rotatable thereabout, and a first pair of motors, each of the first pair of motors connected to a respective one of the first pair of circular masses and operable to independently rotate the respective one of the first pair of masses about the first axis at a variable rotational speed;
   communicating the motion of the mount to a controller; and
   varying, via the controller, a relative rotational speed of the first pair of motors to vary a gyroscopic force generated by the first gyroscope module, in response to the detected motion;
   wherein varying the relative rotational speed of the first pair of motors to vary a gyroscopic force generated by the first gyroscope module includes varying a relative counter-rotational speed of the first pair of motors.

13. The method of claim 12, wherein the motion of the mount is used to control movement of an object in a virtual environment; and
   the method further comprises varying, via the controller, the relative rotational speed of the first pair of motors to vary the gyroscopic force generated by the first gyroscope module, in response to an interaction of the object within the virtual environment.

14. The method of claim 13, wherein a second gyroscope module is also connected to the mount, the second gyroscope module including a second pair of masses aligned along a second axis and rotatable thereabout, the second axis being offset from the first axis, and a second pair of motors, each of the second pair of motors connected to a respective one of the second pair of masses and operable to independently rotate the respective one of the second pair of masses about the second axis at a variable rotational speed; and the method further comprises varying, via the controller, a relative rotational speed of the second pair of motors to vary a gyroscopic force generated by the second gyroscope module, in response to the detected motion.

15. The method of claim 14, wherein a third gyroscope module is also connected to the mount, the third gyroscope module including a third pair of masses aligned along a third axis and rotatable thereabout, the third axis being offset from the first and second axes, and a third pair of motors, each of the third pair of motors connected to a respective one of the third pair of masses and operable to independently rotate the respective one of the third pair of masses about the third axis at a variable rotational speed; and the method further comprises varying, via the controller, a relative rotational speed of the third pair of motors to vary a gyroscopic force generated by the third gyroscope module, in response to the detected motion.

16. The method of claim 12, further comprising varying, via the controller, a rotational direction of at least one of the first pair of motors to vary a gyroscopic force generated by the first gyroscope module in response to the detected motion.

* * * * *